Oct. 17, 1950     M. J. MEYLICH ET AL     2,526,386
WORK LOCATING APPARATUS
Filed July 3, 1948
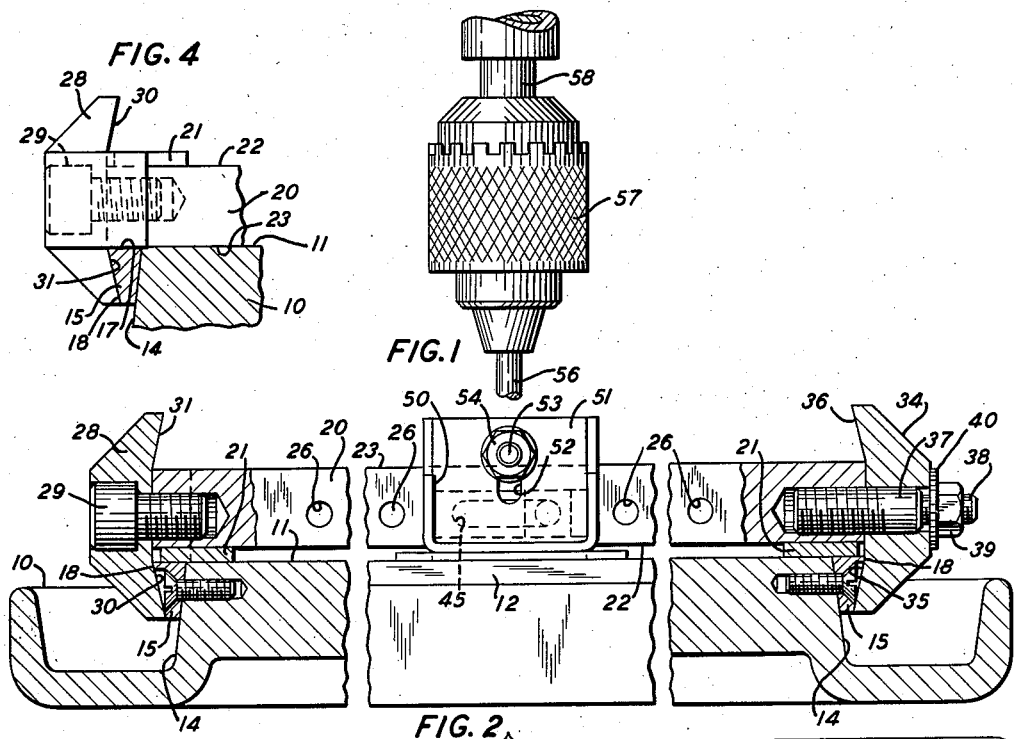
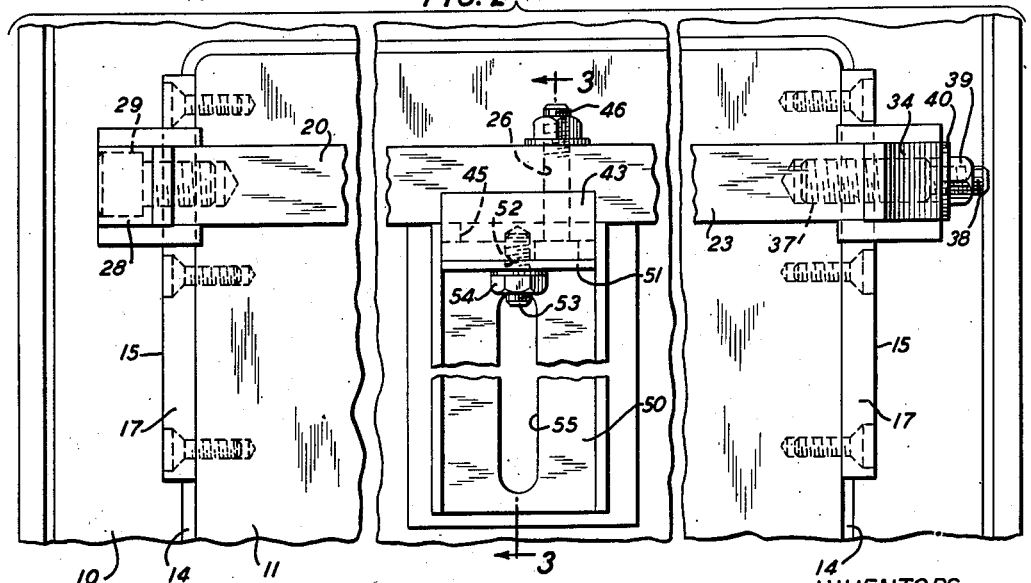
INVENTORS
M. J. MEYLICH
H. J. von HASSELN
BY
W. C. Parnell
ATTORNEY Patented Oct. 17, 1950

2,526,386

UNITED STATES PATENT OFFICE 2,526,386

WORK LOCATING APPARATUS

Milton J. Meylich, West Orange, N. J., and Harold J. von Hasseln, New York, N. Y., assignors to Western Electric Company, Incorporated, New York, N. Y., a corporation of New York Application July 3, 1948, Serial No. 36,976

1 Claim. (Cl. 77—63)

This invention relates to apparatus for locating work on tables of material working machines and has for its object, a stop bar structure which is readily adaptable to material working tables and highly variable to locate work of various thicknesses at any selected position on the table relative to the material working tool of the machine.

In material working machines such as drill presses, punching and forming machines, a work supporting table is positioned beneath the reciprocating unit of the machine which supports the material working tool. Tables of this type are usually cast steel structures with side edges tapering inwardly toward their top supporting surfaces making it impractical and ofttimes impossible to secure any locating means for work on the table, unless it is fixedly mounted on the supporting surface of the table. Such locating means are not practical when it is necessary for one machine to perform work on articles or materials of various sizes and contours.

With the aforementioned object in view, the invention comprises an apparatus for locating work on the table of a material working machine relative to a reciprocable material working tool thereof, the apparatus including tapered members secured to the opposing sides of the table, by the aid of which a stop element positioned transversely of the table may be secured thereto. A stop member cooperating with the element to locate work at selected variable positions on the table, relative to the material working tool is adjustably secured to the stop element at any desired position longitudinally thereof.

More specifically, the stop element has spacing members disposed on one surface thereof adjacent the ends of the element to space the major portion of that surface from the table to allow for chip clearance for work of given thickness greater than the clearance distance between the said surface and the table. Equally spaced apertures are formed in the stop element throughout the major portion of its length to receive the mounting bolt for the stop member which is provided with an elongate aperture, through which the bolt extends, permitting location of the stop member at any position throughout the length of the stop element for locating work relative to the material working tool. Mounting heads secured to the ends of the stop element permit securing of the stop element in any one of two positions on the table by engagement with the tapered members, with either the spacing members resting on the table or the opposing surface of the stop element. One of the retaining members may be loosened on the stop element to allow for adjustment of the stop element relative to the table. In some instances, particularly during the drilling or forming of thin material, it is advantageous to provide means to hold the material on the table, particularly during removal of the working tool. A hold-down arm is mounted on the stop member for vertical adjustment thereon and for adjustment therewith into any desired position.

Other objects and advantages will be apparent from the following detailed description when considered in conjunction with the accompanying drawing, wherein Fig. 1 is a fragmentary sectional view of a material working machine illustrating the locating apparatus thereon;

Fig. 2 is a fragmentary top plan view of the structure shown in Fig. 1 with the exception of the material working tool;

Fig. 3 is a fragmentary sectional view taken substantially along the line 3—3 of Fig. 2; and Fig. 4 is a fragmentary detailed view illustrating the stop element in the reverse position from that shown in Fig. 1.

Referring now to the drawing, the machine employed to illustrate the invention is a drill press, only fragmentary portions of which are illustrated in the drawing including a table 10 having a work supporting surface 11 and a central clearance hole 12. The sides 14 of the table 10 taper inwardly toward the upper surface 11 in the conventional manner and in order that the locating apparatus may be adjustably mounted on the table, tapered members 15 are secured to the sides 14 as illustrated in Figs. 1 and 2. The tapered members 15 have inner surfaces which lie flush with the sides 14 and provide top surfaces 17 positioned in a plane with the supporting surface 11 of the table 10. The outer surfaces 18 extend diagonally inwardly from the plane of the surface 11 for a purpose hereinafter described.

A stop or locating element 20 is positioned transversely of the table 10 and has spacing members 21 mounted at the ends of a surface 22 thereof to space this surface from the surface 11 when mounted on the table in the position shown in Fig. 1. An opposing surface 23 of the stop element, parallel with the surface 22, may rest upon the surface 11 of the table in certain instances as illustrated in Fig. 4. A plurality of equally spaced apertures 26 are formed in the stop element 20 for the greater portion of its length with their centerlines lying in a plane equi-distant between the surface 23 and the table engaging surfaces of the spacing members 21. If desired, the spacing members 21 may be integral with the stop element, this producing a stop element with the centerlines of the apertures 26 lying in a plane coincident with the centerline of the stop element and to remain in the said plane regardless of whether the surface 23 rests on the table or the opposing surface with the recessed portion 22 is positioned on the table.

A mounting head 28 of the contour shown is secured to one end of the stop element 20 by a screw 29 and includes tapered surfaces 30 and 31 to engage their respective tapered member 15 in adjustably securing the stop element in selected position on the table. A mounting head 34, identical in structure with the mounting head 28, including tapered surfaces 35 and 36 for engaging their respective tapered member 15, is centrally apertured to receive a threaded member 37, the inner end of which is threadedly connected to the adjacent end of a stop element 20. A reduced threaded portion 38 of the threaded member 37 receives a nut 39 and washer 40 whereby the mounting head 34 may be made loose for adjustment of the stop element relative to the table or tightened to secure the stop element in its adjusted position.

A stop member 43 of the cross-sectional contour shown in Fig. 3 with the cutaway portion providing a shoulder 44 to rest upon the stop element 20 has a laterally extending elongate aperture 45 therein to receive a mounting bolt 46 which may also extend through any of the apertures 26 to secure the stop member at any position longitudinally of the stop element. It will be noted that when the stop member 43 is secured to the stop element 20, its lower surface 47 will rest upon or be positioned closely adjacent the surface 11 of the table 10.

A hold down arm 50 has a vertical portion 51 with a vertically extending elongate aperture 52 therein for mounting on the stop member in selected variable positions relative to the surface 11 of the table 10 by the aid of a stud 53 and a nut 54 carried by the stop member as illustrated in Fig. 3. The horizontal portion of the arm 50 has an elongate aperture 55 therein to receive a material working tool 56 which in the present embodiment of the invention is a drill. The drill is held in a chuck 57 of the machine and supported by the rotatable spindle 58 which is reciprocated relative to the table in the conventional manner.

The function of the apparatus may be readily understood when it is realized that by mounting the tapered members 15 at the sides of the conventional work supporting table of the material working machine, the stop element 20, together with the stop member 43 and/or the hold down arm 50 may be adjusted into a multiplicity of selected positions depending upon the shape, thickness and contour of the work. In some instances, the hold down arm 50 is not employed, but the stop member 43 is moved to a selected position on the stop element 20 and the stop member and stop element are moved in unison relative to the operating center of the material working tool, depending upon the location of the hole to be drilled in the work relative to given surfaces of the work which are to rest against one side or the other of the stop member and one surface of the stop element. When the apparatus is set up to perform a given function, it remains in this position until different work is to have apertures drilled therein or operations performed thereon. The adjustments may be readily made requiring a minimum of time and thus conditioning the material working machine to perform numerous operations with the same locating apparatus.

When operating upon thinner material or in such instances when it is desirable for the stop member to rest directly upon the surface 11, it may be reversed and disposed in the position shown in Fig. 4. In this position, the apertures 26 are disposed in the same plane positioned the same distance from the surface 11 as they were when positioned as illustrated in Fig. 1. The apertures 26 enable the operator to position the stop member at selected positions longitudinally of the stop element and the elongate aperture 45 enables the operator to make finer adjustments of the stop member relative to the stop element.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

An apparatus for locating work on the table of a material working machine relative to a reciprocable material working tool thereof, the apparatus comprising a stop element having a row of apertures therein disposed at spaced positions with their centerlines in a plane coincident with the centerline of the stop element, the stop element being disposed transversely of the table and having opposing surfaces, one to rest on the table when the stop element is in one position and the other resting on the table at small portions of its length, the major portion thereof being spaced from the table when the stop element is in the reverse position, mounting heads carried by the ends of the stop element and having tapered surfaces to engage and grip their tapered members to secure the stop element in either position at any selected location on the table, means to cause relative movement of the mounting heads toward or away from each other to clamp the stop element in a selected position on the table or free the stop element for adjustment on the table, a stop member having an elongate aperture therein, and means receivable in the elongate aperture of the stop member and any one of the apertures of the stop element to adjustably secure the stop member at any selected position longitudinally of the stop element and cooperate therewith to locate work at selected variable positions on the table relative to the material working tool.

MILTON J. MEYLICH.
HAROLD J. von HASSELN.

REFERENCES CITED

The following references are of record in the file of this patent:

UNITED STATES PATENTS

| Number | Name | Date |
| --- | --- | --- |
| 1,274,647 | Whipple | Aug. 6, 1918 |
| 1,397,696 | Nelson | Nov. 22, 1921 |
| 1,539,700 | Stramaglia | May 26, 1925 |
| 2,166,692 | Ray | July 18, 1939 |
| 2,182,019 | Eisele | Dec. 5, 1939 |
| 2,240,242 | Cole | Apr. 29, 1941 |
| 2,276,819 | Boehmer | Mar. 17, 1942 |
| 2,374,286 | Hargadon | Apr. 24, 1924 |
| 2,409,706 | Reppa | Oct. 22, 1946 |